United States Patent Office 2,936,243
Patented May 10, 1960

2,936,243

LINOLEUM

Joseph W. Ayers, Easton, Pa., assignor to J. W. Ayers & Co., Easton, Pa., a corporation of Delaware No Drawing. Application June 30, 1955
Serial No. 519,223

17 Claims. (Cl. 106—123)

This invention relates to linoleum compositions and compounds in the form of floor and wall coverings as sheets, tiles and the like for artistic and wear-resistant coatings and other purposes, and to processes for making such products.

At the present time, linoleum cements are commonly made in a two stage process involving first, the esterification of tall oil (especially refined grades having high rosin content), with pentaerythritol or other polyhydric alcohols, and in the second stage, mixing the esters with linseed or other drying oils, litharge and other minor ingredients, and heating and blowing the same with air until the viscosity increases and forms a plastic cement. Then fillers, pigments and colors are worked into the cement, thereby forming linoleum compound capable of being sheeted.

When tall oil is employed in these cements, it is preferable that the tall oil be esterified with a polyhydric alcohol. The amount of alcohol based on an equivalent weight of tall oil may vary from 0.1 to 1.1 equivalents of the polyol, but for satisfactory results, with respect to water and alkali resistance, ratios of 1 equivalent of tall oil to 0.3–0.8 equivalent of polyol are generally employed. The polyols of the types employed are relatively expensive, especially when used in the required amounts.

An object of the invention is to produce linoleum compounds and products of very superior quality particularly as to water and alkali resistance but also as to wear resistance.

Another object of the invention is to produce superior or at least equally satisfactory linoleum compounds without using any, or more than a small amount of a polyhydric alcohol, whereby the linoleum products can be produced at a lower cost.

Another object is to make it possible to produce good quality linoleums from mixtures of linseed, or other oil or oils having drying properties, with tall oil. Linseed or other like oils may be present in smaller proportions than is acceptable in present linoleum cements, thus reducing the cost of production without sacrifice in quality of the linoleum produced therefrom.

Broadly considered, the process of the invention involves the production of linoleum compounds using various combinations of conventional or known procedures and ingredients with the innovation that a small amount of an aluminum alcoholate or derivative thereof classifiable as an "acid acceptor" is incorporated in a mixture of linseed oil, or other oils having drying properties, with tall oil, and preferably for economic reasons, in the complete absence or substantial absence of pentaerythritol or other polyol used heretofore.

After the addition of the usual driers the foregoing mixtures are desirably heated and oxidized by air-blowing as in the usual Bedford kettles until the required viscosity or plasticity is obtained, and thereupon the resulting cement is mixed with a conventional amount of either the usual pigment mixture of organic and inorganic fillers, or exclusively of inorganic fillers, and with other conventional compounding ingredients to form a mastic, which is or may be later sheeted and cured to produce linoleum.

The aluminum compound modifies the oils and esters and apparently serves among other functions as a cross-linking agent for the various components present and those formed during oxidation such as their carboxyl groups, and provides not only a compound of the desired properties for fabrication but also enhances the binding action in the ultimate linoleum cements imparting the highly satisfactory qualities hereinafter brought out.

Within the broad definition set out above, the aluminum compounds utilizable under the invention may be defined by the formula:

wherein X is an alcoholate, a phenolate, or an acylate radical; Y and Z each is an alcoholate, a phenolate or an acylate radical, or, are a =O atom together; and Y may be an OH group when only one of X and Z is an acylate radical.

The alcoholate, phenolate and acyalte radicals attached to the aluminum atom may contain a hydrocarbon chain of any number of carbon atoms of any configuration, and such chain may be unsubstituted or it may be substituted with non-functional groups or with functional groups as hydroxy, carboxy, ester, ether and keto groups. Thus the radicals attached to the aluminum atom may be derived from glycols, from enolizing organic compounds such as keto esters and diketones, from dicarboxylic acids or anhydrides including phthalic acid and from compounds containing mixtures of said radicals.

Not only may the monomers of the compounds be employed but also the polymers of the same where they exist.

Although experimentation indicates that the described aluminum compounds are operable as a class in the linoleum products of the invention, the individual aluminum compounds within the class are in no sense equal in their ability to impart the highly desirable qualities in the linoelum products. The preferred aluminum alcoholate compounds and derivatives are those which are not so highly reactive as to interfere with the control of the oxidation during blowing, these compounds being those containing one or more higher molecular radicals as acyl, keto-ester or alkoxy groups of six or more carbon atoms. In these compounds one active group on the aluminum atom may provide adequate reaction.

A highly effective group of aluminum compounds may be defined as hydroxy, alkoxy aluminum acylates, which compounds are described in the copending application of Jacobus Rinse, Serial No. 495,765, filed March 21, 1955. The corresponding hydroxy, phenoxy aluminum acylates are also described therein. The alkoxy group attached to the aluminum atom is described as being either normal or iso and to be produced preferably from lower molecular alcohols. In addition, cresoxy groups are mentioned as well as other phenoxy groups of relatively low boiling phenols. The acylate radical is desicrbed as being produced from any monocarboxylic acid including unsaturated and saturated fatty acids, from formic to stearic acid. Also radicals from cycloaliphatic acids such as the naphthenic acids and hexahydrobenzoic acid are disclosed; also aromatic acids such as benzoic acid, simple acetic acid and finally abietic acid and other rosin acids. Polymers of the aluminum alcoholate compounds, such as those obtained simply by heating to temperatures at which alcohol is liberated, may also be used in the linoleum compounds of the invention, for such polymers split in the presence of the acid in the cement and provide the required activity.

Liquid compounds of this class, such as hydroxy, isopropoxy aluminum oleate, are most suitable, for they are easier to handle and mix more readily with the other ingredients, thereby providing uniform distribution throughout the cement and decreasing the tendency for localized action, this condition being desirable if not essential in obtaining uniform reaction throughout the mass.

The oxo-aluminum acylate derivatives of aluminum alcoholates are described in the co-pending application of Jacobus Rinse, Serial No. 533,235, filed September 8, 1955, based on the Netherlands application No. 190,684, filed September 11, 1954. Here compounds derived from aluminum alcoholates are described having the formula RCOO—Al=O, in which R is any alkyl group, the acyl radical corresponding to or being derived from any carboxylic acid, normal or branched, saturated or unsaturated and of any number of carbon atoms, the most important being those compounds containing acylates of higher fatty acids such as oleic acid and stearic acid.

Other types of operable alcoholates may be defined as alkoxy aluminum acylates including dialkoxy aluminum monoacylates and monoalkoxy aluminum diacylates and the corresponding phenoxy compounds, which compounds are described in the application of Jacobus Rinse, Serial No. 489,777, filed February 21, 1955. In this application it is disclosed that the alkoxy and phenoxy groups may be derived from or correspond to the same alcohols and phenols hereinbefore described with reference to the hydroxy alkoxy aluminum acylates and their corresponding phenoxy compounds. The acylate radicals as described in this application may correspond to carboxylic acids of the type hereinbefore described. Polymers of the oxo-aluminum acylates may be used instead of the monomers.

Collectively considered, the above described preferred types of aluminum compounds may be referred to as active aluminum alcoholates containing one or more substituents on the aluminum atom which impart stability thereto in the compounding operations at room and normal operating temperatures, and inhibit premature reaction and localized reactions.

Simple aluminum alcoholates of both lower and higher molecular alcohols may be used, as aluminum isopropylate and aluminum oleylate, but the high reactivity of the lower members at normal temperatures interferes with their effectiveness and puts undesirable limitations on their use as to quantities and compounding conditions.

The oils used in the composition of the invention may be defined broadly as oils having drying properties, i.e., those which dry and harden by the action of oxygen of the atmosphere coupled with polymerization. These "hardenable oils" include those classified as drying oils as well as those classified as semi-drying oils, as for example, linseed, tung, perilla, soybean, menhaden oils and other vegetable and animal oils and mixtures thereof. Any of such oils heretofore utilizable in linoleum manufacture can be employed.

Tall oil products of commerce as a class can be successfully employed in the compositions of the invention. Suitable refined tall oils are those having as much as 55% rosin content and those fractionated grades containing as low as 1 to 2% rosin. Better results are generally obtained when the rosin content is from 15 to 30% or more. Tall oil of the preferred rosin content will ordinarily have an acid number of from 150 to 210. The tall oil may be replaced in part by waste fatty acid materials, obtained from industrial processes, as those derived from soap stock and those obtained from linseed oil purification. The latter material may be substituted in large part if not completely for the tall oil.

The proportions of drying oil, or semi-drying oil, to tall oil used in the compositions of the invention may be varied within wide limits depending upon the quality desired in the final linoleum produced. Good quality products can be obtained with less than half as drying or semi-drying oil, but improvements in quality can be obtained by the presence of the linking agent in oil mixtures of from 5 to 95 parts (by weight) of one component to 95 to 5 of the other.

Although the linoleum compounds hereinbefore described require no addition of polyhydric alcohol, the acid content of the tall oil may be partially neutralized if desired by the addition of pentaerythritol, glycerin, sorbitol, methyl glucoside and/or other polyol. Up to 5% alcohol or more of the theoretical amount reactable in the mass produces good products and is economically feasible. Amounts as low as 1% are worth-while, but the improvement in quality in the final product is not as substantial. The degree of esterification accomplished may be influenced by the acid number of the tall oil used.

The amount of aluminum compound incorporated in the linoleum cements of the invention may be varied within wide limits depending upon the chemical structure of the tri-functional aluminum compound. The amount used can be as low as 0.1 of one percent of the weight of the total binder content. The maximum beneficial amount appears (theoretically) to be approximately 1:1 in relation to the oil mixture. For economic reasons the minimum amount necessary to impart the desired action is used.

The preferred method of incorporating the aluminum compound into the other ingredients involves introducing the same into the drying oil-tall oil mass prior to blowing. The aluminum appears to react during the blowing and serves to improve the quality of the cement made from the oil mixture as well as to improve the final quality of the linoleum produced therefrom. Substantial improvement, however, can also be obtained by adding the aluminum compound to the linoleum cement after the blowing is either partially or wholly completed. The highly active alcoholates may require dilution with a solvent and/or strenuous agitation to accomplish thorough or homogeneous dispersion.

No novelty is involved in the selection of driers or the pigments, for conventional compounds and mixtures can be used. Satisfactory fillers include wood flour, nut shell flour, alpha cellulose; asbestos, whiting, hydrous and anhydrous calcium sulfate, magnesium silicates, as asbestine, slate flour, diatomaceous silica, precipitated calcium carbonate, calcium silicate and aluminum hydroxides. Generally the filler content in the linoleum compound may amount to 55 to 75%, the rest being the binder.

The invention is illustrated by the compositions and test data set forth in the examples and tables hereinafter set out. For comparative purposes linoleum samples were prepared using a linseed-rosin mixture essentially of the Taylor type containing 77% fatty acids and 23% rosin, the blow time used being 29 hours. This cement was compounded into the linoleum samples in the same way as the samples of the invention with the pigments shown in the tables, referred to as "standard."

*Example 1*

In parts by weight, 375 parts of refined tall oil having a rosin content of 45% are mixed with 225 parts of linseed oil, 4.8 parts of litharge, 2.5 parts manganese resinate (6%) and 30 parts of hydroxy, isopropoxy aluminum oleate. The mixture thereby obtained is then blown with air for 39 hours at a temperature of about 185° F. A dry, tough cement is thereby obtained.

One hundred and six parts of the cement is mixed with 98 parts of wood flour, 84 parts of whiting and 14.5 parts of titanium dioxide and processed by means of a 3-roll mill and calendered at 75°–80° F. (room temperature) until sheets were obtained. There was no indication of sticking or pulling and the sheets obtained were strong and tough.

Example 2

An all mineral filler linoleum compound was produced by mixing 80 parts of the linoleum cement produced in accordance with the process of Example 1 with 10.5 parts of titanium dioxide, 92 parts of aluminum hydrate, 12 parts of calcium sulfate and 72 parts of asbestos shorts. This mixture was further processed in accordance with the procedure specified in Example 1 and likewise strong and tough sheets were obtained.

Example 3

For using oxo-aluminum oleate as the linking agent, the process and procedure of Example 1 is repeated except for the substitution of the agent. Good quality sheets can thus be obtained.

Example 4

Oxo-aluminum oleate is substituted for the linking agent in the process and procedure of Example 2. Linoleum sheets of good quality can thus be obtained.

Example 5

For the production of cements containing a polyhydric alcohol esterification agent, the process and procedure of Example 1 is repeated with the change that 18 parts (5% on the tall oil) of pentaerythritol is added to the tall oil-linseed oil mixture during heating in accordance with conventional esterification procedures in linoleum cement production, and the partially esterified mass after cooling is then mixed with the hydroxy, isopropoxy aluminum oleate and other ingredients and blown in the same way.

In the foregoing examples, other aluminum compounds may be substituted with varying degrees of success. The aluminum compounds and derivatives containing a radical or radicals of long chain fatty acids or alcohols of at least 12 carbon atoms generally give best results, examples of the same being hydroxy, isobutoxy aluminum stearate, di-isopropoxy aluminum laurate, oxo-aluminum stearate and linoleate, di-isopropoxy aluminum oleate and true aluminum triacylates (free of OH groups) of low or medium length carbon chains. Other operable aluminum compounds include aluminum isopropylate, butylate and isobutylate; also oxo-aluminum acetate and butyrate and other compounds disclosed in the hereinbefore mentioned applications. Preferred aluminum compounds are those which are liquid and miscible with the oil mixtures wherein no solvent or plasticizer is required.

The quality of the linoleums producible in accordance with the present invention is exemplified in the following table:

|  | Example 1 | Example 2 | Standard |
|---|---|---|---|
| Cure [1] | 6 | 2½ | 7 |
| Percent Dent [2] | [8] 7 | [9] 1.4 | [10] 2 |
| Flexibility [3] | 1 | (11) | [3a] 1½ |
| Water Resist. [4] | 5 | 2.3 | 4.3 |
| Abrasion: |  |  |  |
| Dry [5] | 5.1 | 7.0 | 9.8 |
| Wet [6] | 1 | 4.2 | [6a] 7.7 |
| Alkali Resist. [7] | 5 | 12 | 4 |

[1] Time in days for percent dent.
[2] Original indentation after cure.
[3] Mandrel in inches, cured—1 week old.
[3a] Mandrel in inches, cured—1 month old.
[4] Percent water absorbed, 24 hour immersion.
[5] Gardner Machine, 1/0 emery cloth—15,000 rubs, percent loss caliper.
[6] Gardner Machine, 1% NaOH—10,000 rubs, percent loss caliper.
[6a] Gardner Machine, 1% NaOH—10,000 rubs, percent gain caliper due to swelling.
[7] Hours to complete failure, immersed in 1% NaOH.
[8] Residual dent—recovery after 10 min.—96% of original dent.
[9] Residual dent—recovery after 10 min.—97% of original dent.
[10] Residual dent—recovery after 10 min.—47% of original dent.
[11] Too brittle for this test but satisfactory in specific linoleum products.

From the foregoing tests it can be observed that the addition of tall oil to linseed oil when an addition of the aluminum compound is also made improves the linoleum compounds.

A general advantage of the present invention is that the linoleum producer can, by variation in the content of the oil mixtures and the amounts of additives used, fabricate linoleums of a wide scale of quality from good grades to those of very high quality, all of which can be produced at an acceptably low cost.

It should be understood that the present invention is not limited to the specific procedures, processing conditions, reactants or fillers herein disclosed but that it extends to all equivalents which will occur to those skilled in the art upon consideration of the scope of the claims appended hereto.

I claim:

1. Linoleum compounds, the oxidized oil content of which consists essentially of an oxidized mixture of a hardenable oil having drying properties and tall oil, modified through cross-linking of molecules therein by reaction with an aluminum compound selected from the group consisting of hydroxy, R-oxy aluminum acylates, oxo-aluminum acylates and their polymers obtained by heating the same, said R-oxy groups being selected from the group consisting of alkoxy radicals and phenoxy radicals, the proportion of aluminum compound used being from 0.1% of the weight of the total binder content present to approximately 1:1 in relation to the weight of said oil mixture.

2. Linoleum compounds, the oxidized oil content of which consists essentially of an oxidized mixture of a drying oil of at least semi-drying oil drying capacity and substantially unesterified tall oil, modified by reaction with an aluminum compound containing at least one chain of at least six carbon atoms, selected from the group consisting of hydroxy, R-oxy aluminum acylates, oxoaluminum acylates and their polymers obtained by heating the same, said R-oxy groups being selected from the group consisting of alkoxy radicals and phenoxy radicals, the proportion of aluminum compound used being from 0.1% of the weight of the total binder content present to approximately 1:1 in relation to the weight of said oil mixture.

3. Linoleum compounds, the oxidized oil content of which consists essentially of an oxidized mixture of linseed oil and substantially unesterified high rosin content tall oil, modified with an aluminum compound selected from the group consisting of hydroxy, R-oxy aluminum acylates, oxoaluminum acylates and their polymers obtained by heating the same, said R-oxy groups being selected from the group consisting of alkoxy radicals and phenoxy radicals, the proportion of aluminum compound used being from 0.1% of the weight of the total binder content present to approximately 1:1 in relation to the weight of said oil mixture.

4. Linoleum compounds, the oxidized oil content of which consists essentially of an oxidized mixture of a hardenable oil selected from the group consisting of drying oils and semi-drying oils and tall oil and reacted with a hydroxy-, alkoxy-aluminum acylate.

5. Linoleum compounds, the oxidized oil content of which consists essentially of an oxidized mixture of a hardenable oil selected from the group consisting of drying oils and semi-drying oils and substantially unesterified tall oil and reacted with a hydroxy-, alkoxy-aluminum acylate.

6. Linoleum compounds, the oxidized oil content of which consists essentially of an oxidized mixture of a hardenable oil selected from the group consisting of drying oils and semi-drying oils and substantially unesterified tall oil and reacted with a hydroxy-, alkoxy-aluminum oleate.

7. Linoleum compounds, the oxidized oil content of which consists essentially of an oxidized mixture of a hardenable oil selected from the group consisting of drying oils and semi-drying oils and tall oil and reacted with hydroxy-, isopropoxy-aluminum oleate.

8. Linoleum compounds, the oxidized oil content of which consists essentially of an oxidized mixture of a hardenable oil selected from the group consisting of drying oils and semi-drying oils and substantially unesterified tall oil and reacted with hydroxy-, isopropoxy-aluminum oleate.

9. Linoleum compounds, the oxidized oil content of which consists essentially of an oxidized mixture of a film-forming oil and tall oil and reacted with an oxo-aluminum acylate.

10. Linoleum compounds, the oxidized oil content of which consists essentially of an oxidized mixture of a hardenable oil selected from the group consisting of drying oils and semi-drying oils and substantially unesterified tall oil and reacted with an oxo-aluminum acylate.

11. Linoleum compounds, the oxidized oil content of which consists essentially of an oxidized mixture of a hardenable oil selected from the group consisting of drying oils and semi-drying oils and substantially unesterified tall oil and reacted with oxo-aluminum oleate which serves as a linking agent between carboxy and hydroxy groups in said oxidized oil mixture, the proportion of aluminum compound used being from 0.1% of the weight of the total binder content present to approximately 1:1 in relation to the weight of said oil mixture.

12. Linoleum compounds, the oxidized oil content of which consists essentially of an oxidized mixture of a hardenable oil selected from the group consisting of drying oils and semi-drying oils and tall oil and reacted with an aluminum compound selected from the group consisting of hydroxy, R-oxy aluminum acylates, oxo-aluminum acylates and their polymers obtained by heating the same, said R-oxy groups being selected from the group consisting of alkoxy radicals and phenoxy radicals, the proportion of aluminum compound used being from 0.1% of the weight of the total binder content present to approximately 1:1 in relation to the weight of said oil mixture, and having a filler content composed substantially only of inorganic fillers.

13. Linoleum compounds, the oxidized oil content of which consists essentially of an oxidized mixture of linseed oil and unesterified tall oil and reacted with an aluminum compound selected from the group consisting of hydroxy, R-oxy aluminum acylates, oxo-aluminum acylates and their polymers obtained by heating the same, said R-oxy groups being selected from the group consisting of alkoxy radicals and phenoxy radicals, the proportion of aluminum compound used being from 0.1% of the weight of the total binder content present to approximately 1:1 in relation to the weight of said oil mixture, and having a filler content composed substantially only of inorganic fillers.

14. Linoleum compounds, the oxidized oil content of which consists essentially of an oxidized mixture of a drying oil and unesterified tall oil and reacted with a hydroxy-, alkoxy-aluminum acylate, and having a filler content composed substantially only of inorganic fillers.

15. Linoleum sheets and tiles containing a cement consisting essentially of an oxidized mixture of a drying oil, refined tall oil, up to 5% of a polyhydroxy alcohol and an aluminum compound selected from the group consisting of hydroxy, R-oxy aluminum acylates, oxo-aluminum acylates and their polymers obtained by heating the same, said R-oxy groups being selected from the group consisting of alkoxy radicals and phenoxy radicals, the proportion of aluminum compound used being from 0.1% of the weight of the total binder content present to approximately 1:1 in relation to the weight of said oil mixture, the aluminum atoms of said compounds having thereon a stabilizing substituent radical which inhibits premature reaction of the aluminum compound.

16. Linoleum sheets and tiles containing a cement consisting essentially of an oxidized mixture of a hardenable oil selected from the group consisting of drying oils and semi-drying oils, refined tall oil having at least 15% rosin, up to 5% of a polyhydric alcohol and a small amount of an hydroxy-, alkoxy-aluminum acylate serving as a linking agent for hydroxy and carboxylic groups in the oxidized oil mass.

17. In the production of linoleum cements by the oxidation of linseed-tall oil mixtures, the improvement comprising adding to such mixtures an hydroxy-, alkoxy-aluminum acylate, and thereafter oxidizing the mass until the cement is formed.

References Cited in the file of this patent

UNITED STATES PATENTS

| | | |
|---|---|---|
| 2,469,041 | Jones | May 3, 1949 |
| 2,603,571 | Castellano | July 15, 1952 |
| 2,613,162 | Chatfield | Oct. 7, 1952 |
| 2,618,536 | Hunn | Nov. 18, 1952 |
| 2,618,596 | Minich et al. | Nov. 18, 1952 |
| 2,752,262 | Dunlap | June 26, 1956 |
| 2,835,685 | Rinse | May 20, 1958 |